United States Patent [19]
Cheng et al.

[11] Patent Number: 5,901,038
[45] Date of Patent: May 4, 1999

[54] POWER SUPPLY SYSTEM FOR HIGH DENSITY PRINTED CIRCUIT BOARDS

[76] Inventors: Wing Ling Cheng, G/F, No. 68 Po Sam Pai Village Ting Kok Road, Plover Cove Tai Po, New Territories; Neal George Stewart, Astec Custom Power (HK) Ltd. - ATC Blk H, 7/F., CDW Building 388 Castle Peak Road, Tsuen Wan, N.T.; John Michael Groves, 27B Block 12 Wonderland Villas, Kwai Chung, New Territories; Man Keung Tse, Flat H, 24/F1. Block 8, Phase II Belvedere Garden, Tsuen Wan, New Territories; Rex William James Whittle, 22 Ko Tong Village, Sai Kung North, New Territories, all of The Hong Kong Special Administrative Region of the People's Republic of China; Alastair Alexander Keir, 6 Comet St., Bel Air 2 Village, Makati, Metro Manila, Philippines

[21] Appl. No.: 08/819,529

[22] Filed: Mar. 17, 1997

[51] Int. Cl.[6] .................................................... H05K 7/20
[52] U.S. Cl. ........................ 361/704; 361/699; 361/700; 361/775; 361/809; 361/831
[58] Field of Search ..................... 307/150; 361/686–687, 361/690, 699, 700, 704, 707, 775, 807–810, 825, 829, 831

[56] References Cited

U.S. PATENT DOCUMENTS

| | | | |
|---|---|---|---|
| 5,224,024 | 6/1993 | Tu et al. | 361/831 |
| 5,287,244 | 2/1994 | Hileman et al. | 361/687 |
| 5,311,397 | 5/1994 | Harshberger et al. | 361/683 |
| 5,338,214 | 8/1994 | Steffes et al. | 361/687 |
| 5,349,132 | 9/1994 | Miller et al. | 174/35 |
| 5,396,401 | 3/1995 | Nemoz | 361/690 |
| 5,402,312 | 3/1995 | Kinjo et al. | 361/695 |

OTHER PUBLICATIONS

Noren Heat Pipes–Product Description, Noren Products, Inc. (4 pgs.) No Known date.

*Primary Examiner*—Gregory Thompson
*Attorney, Agent, or Firm*—Coudert Brothers

[57] ABSTRACT

The present invention is a mounting structure for a power supply. The mounting structure of the present invention allows power to be coupled from a power supply to a predetermined area on a motherboard adjacent one or more high power demand components, such as an IC microprocessor chip. The mounting structure includes a frame; a plurality of legs attached to the frame for supporting the frame on the motherboard; the ends of the legs opposite the frame being attached to the motherboard; a fastener coupled to the frame for releasably fastening the power supply to the mounting structure such that the power supply is positioned a predefined distance above the upper surface of the motherboard; and a plurality of power buses interconnecting the power supply and the motherboard at predetermined area on the motherboard adjacent a high power demand IC chip. The high power demand IC chip is powered by the power supplied via the power buses such that resistive losses and inductive effects in delivering power to the IC chip are minimized, which among other things enables tight regulation of the voltage applied to IC chip(s). The mounting structure of the present invention also allows more efficient use of the motherboard area since it both minimizes the area needed on the motherboard for high power conductive traces and minimizes the area needed on the motherboard for the mechanical connection of the mounting structure thereto.

36 Claims, 14 Drawing Sheets

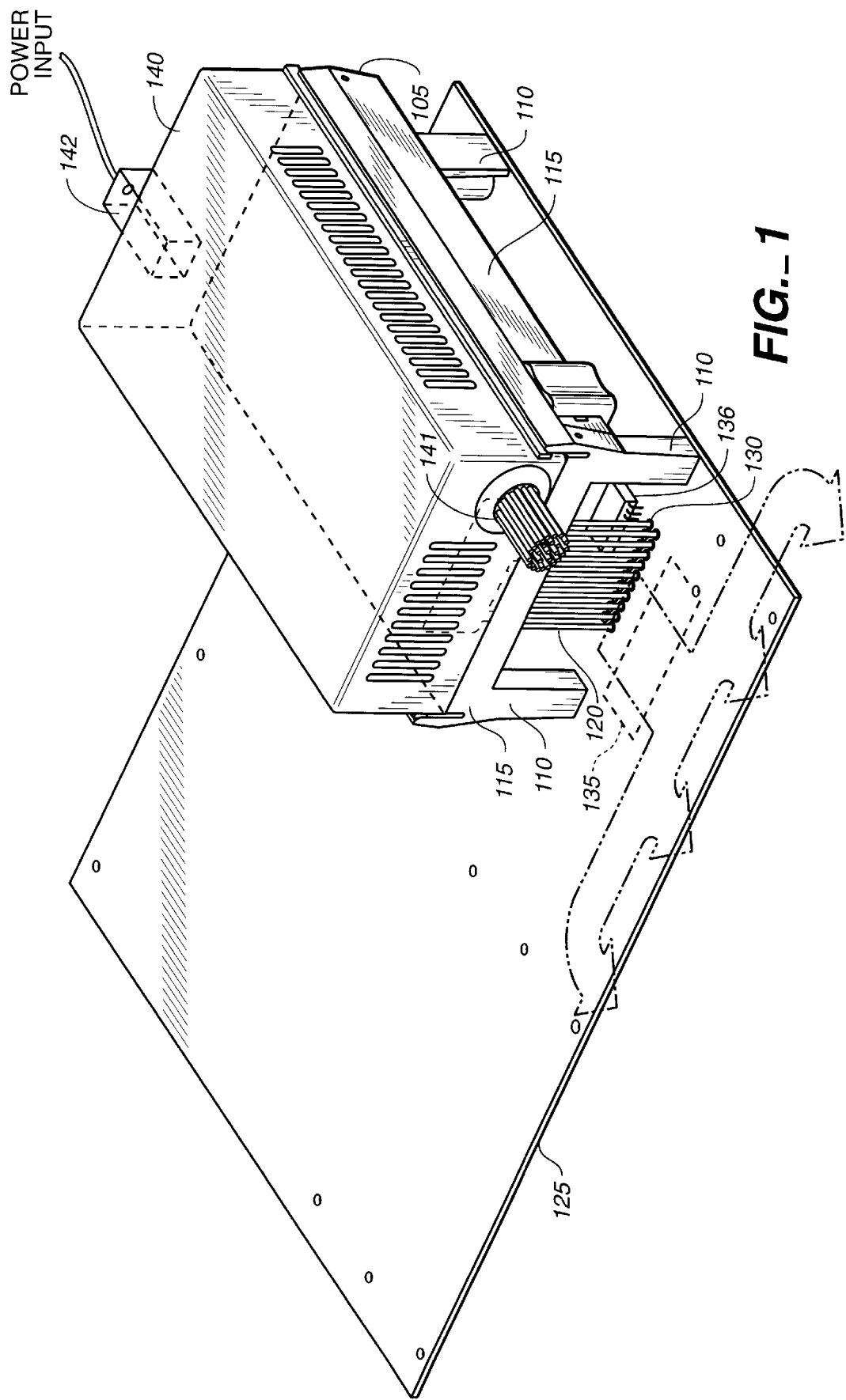

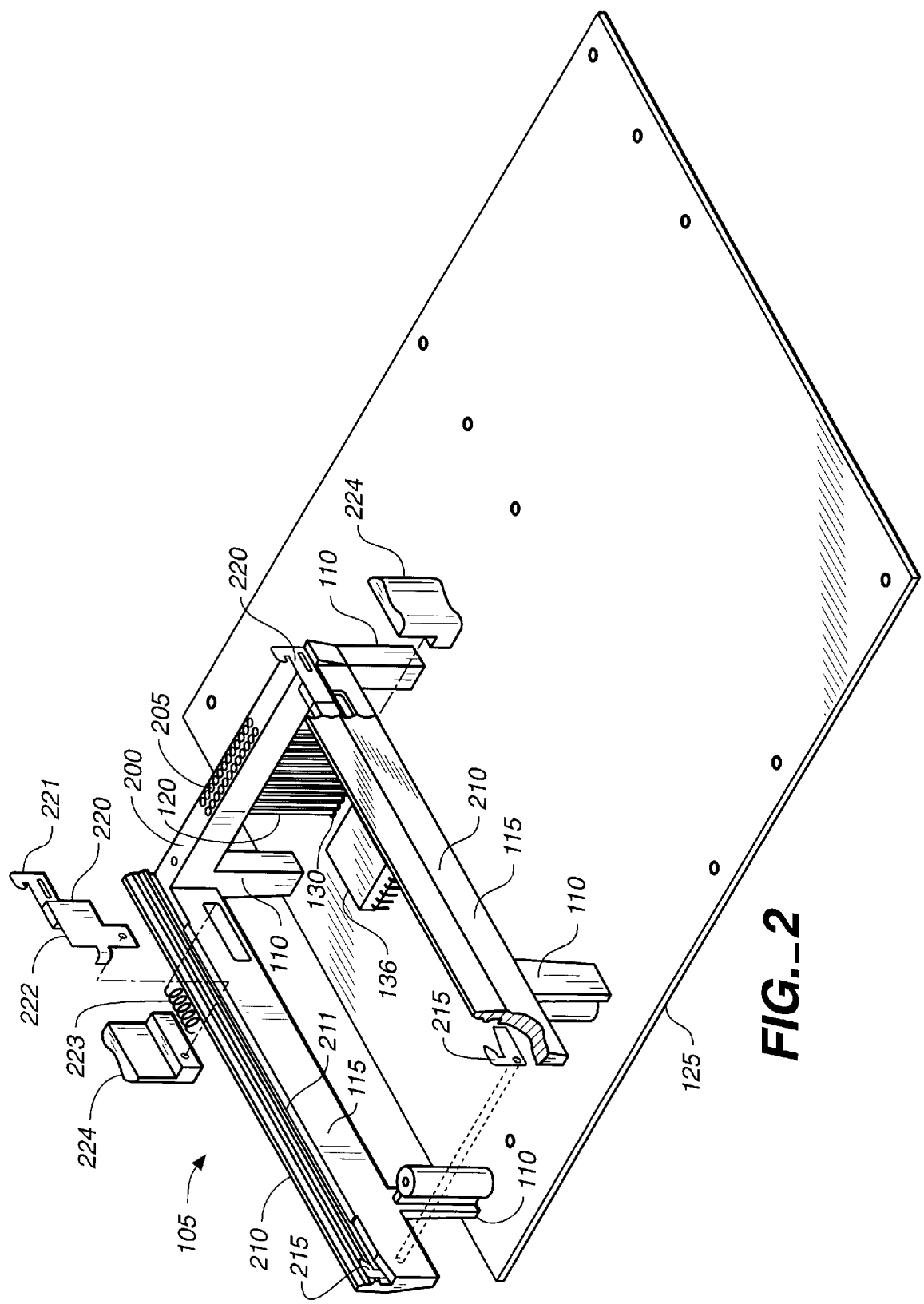
FIG._2

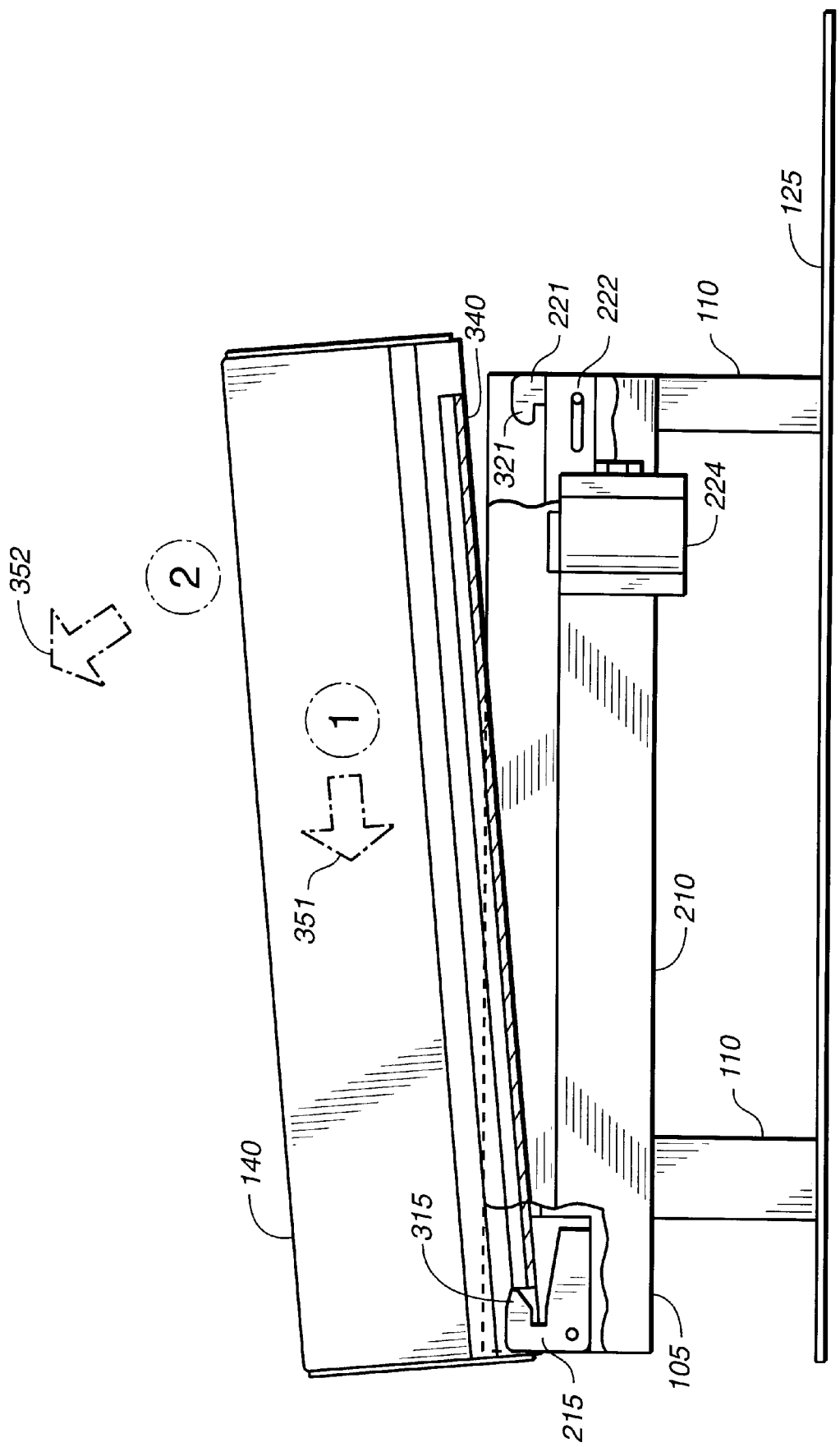
FIG._3

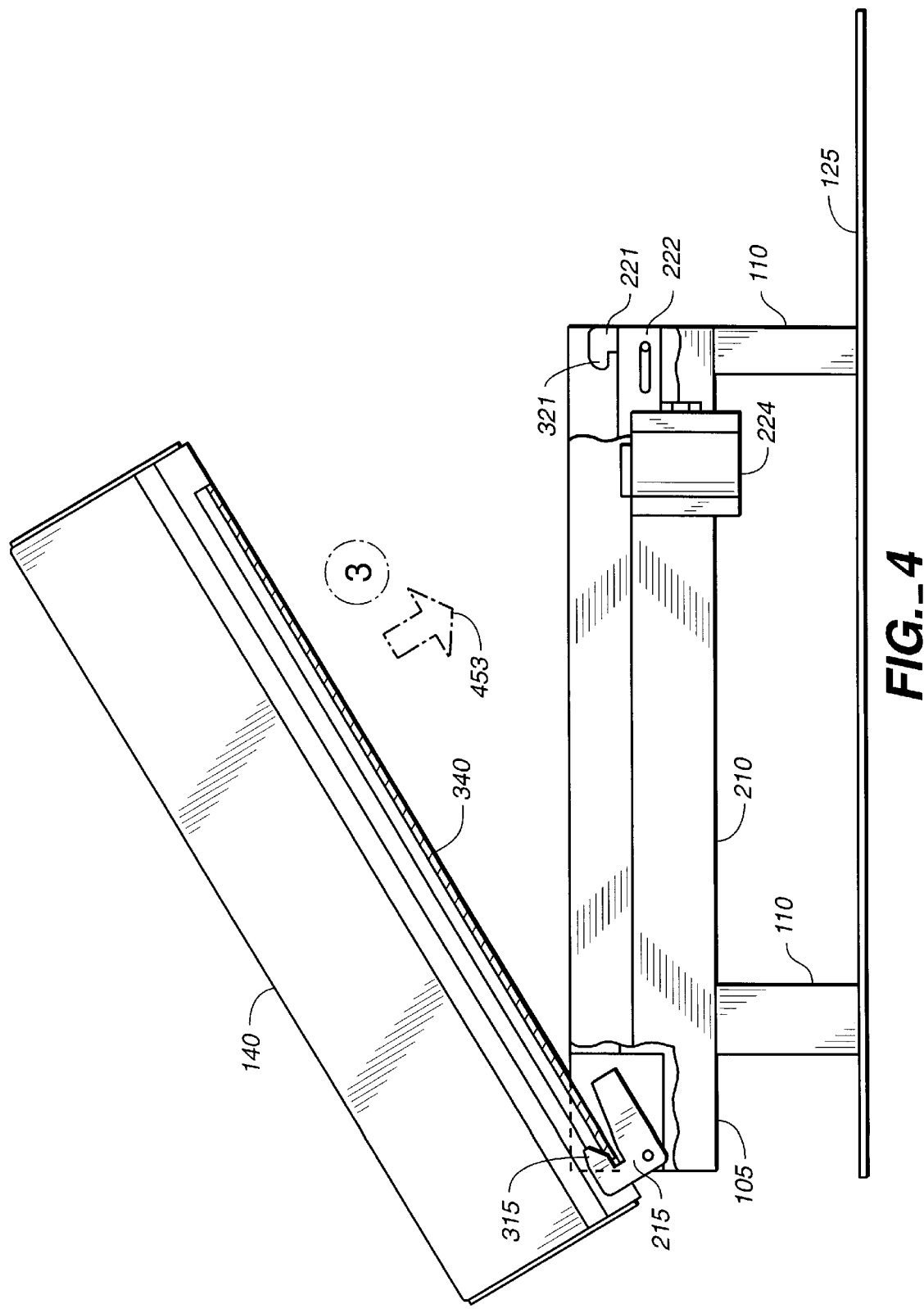

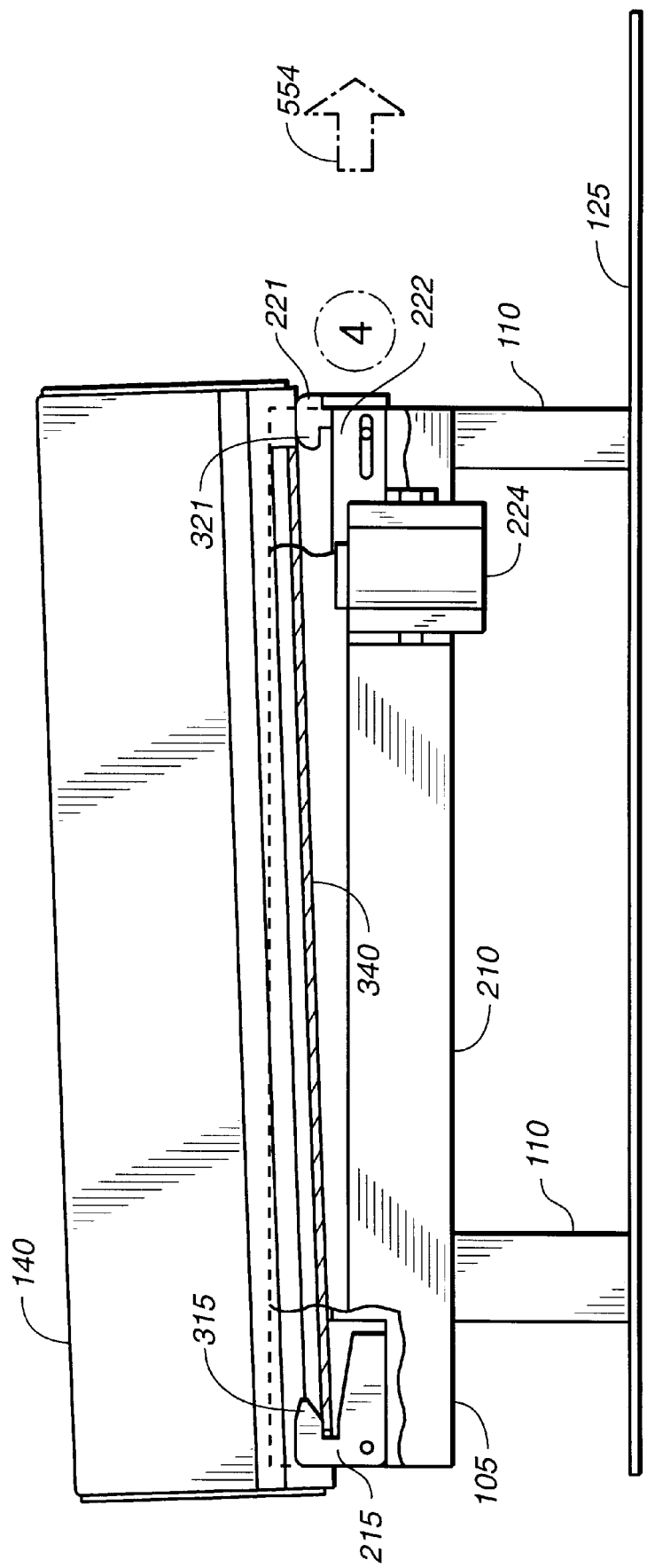
FIG._5

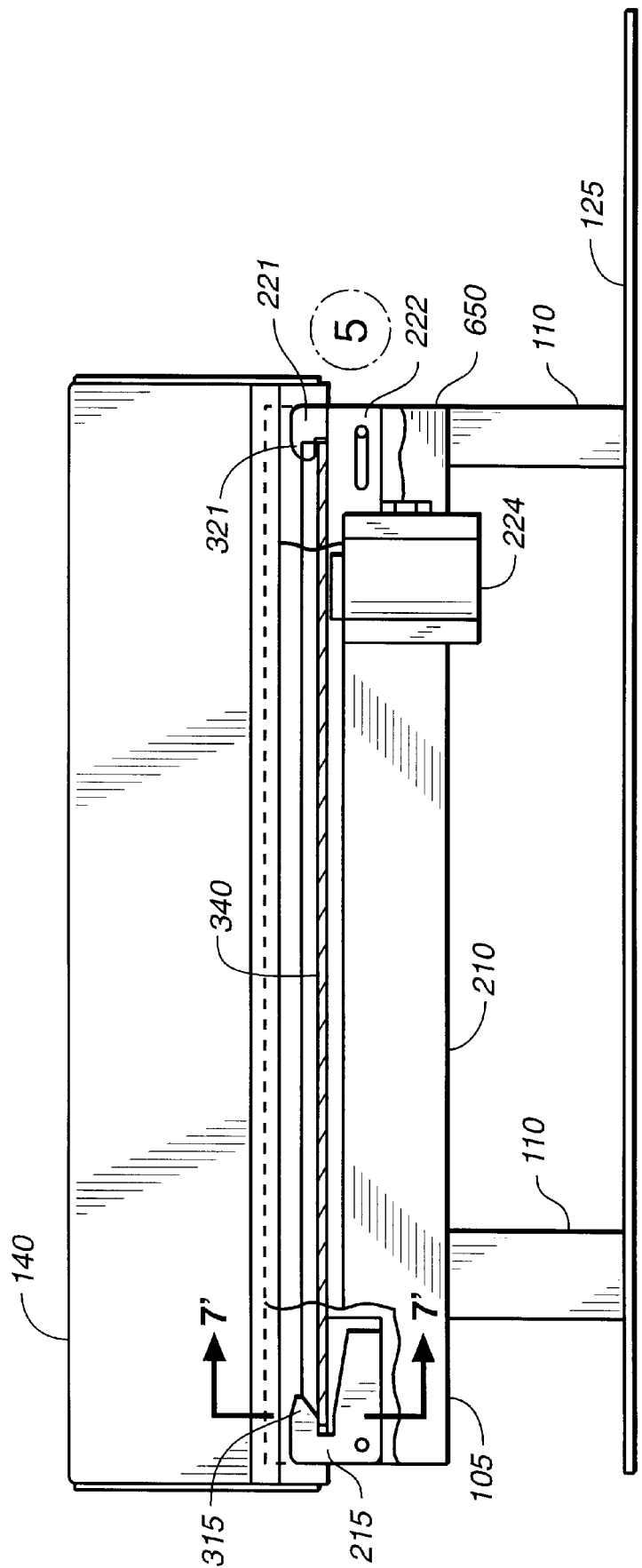

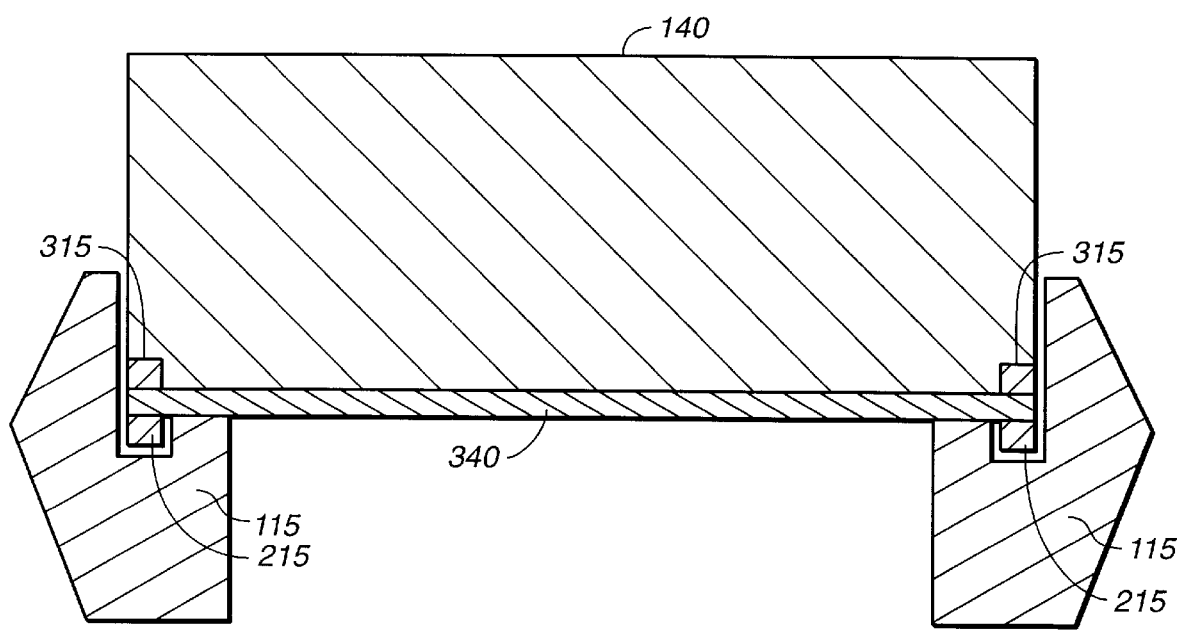
FIG._7

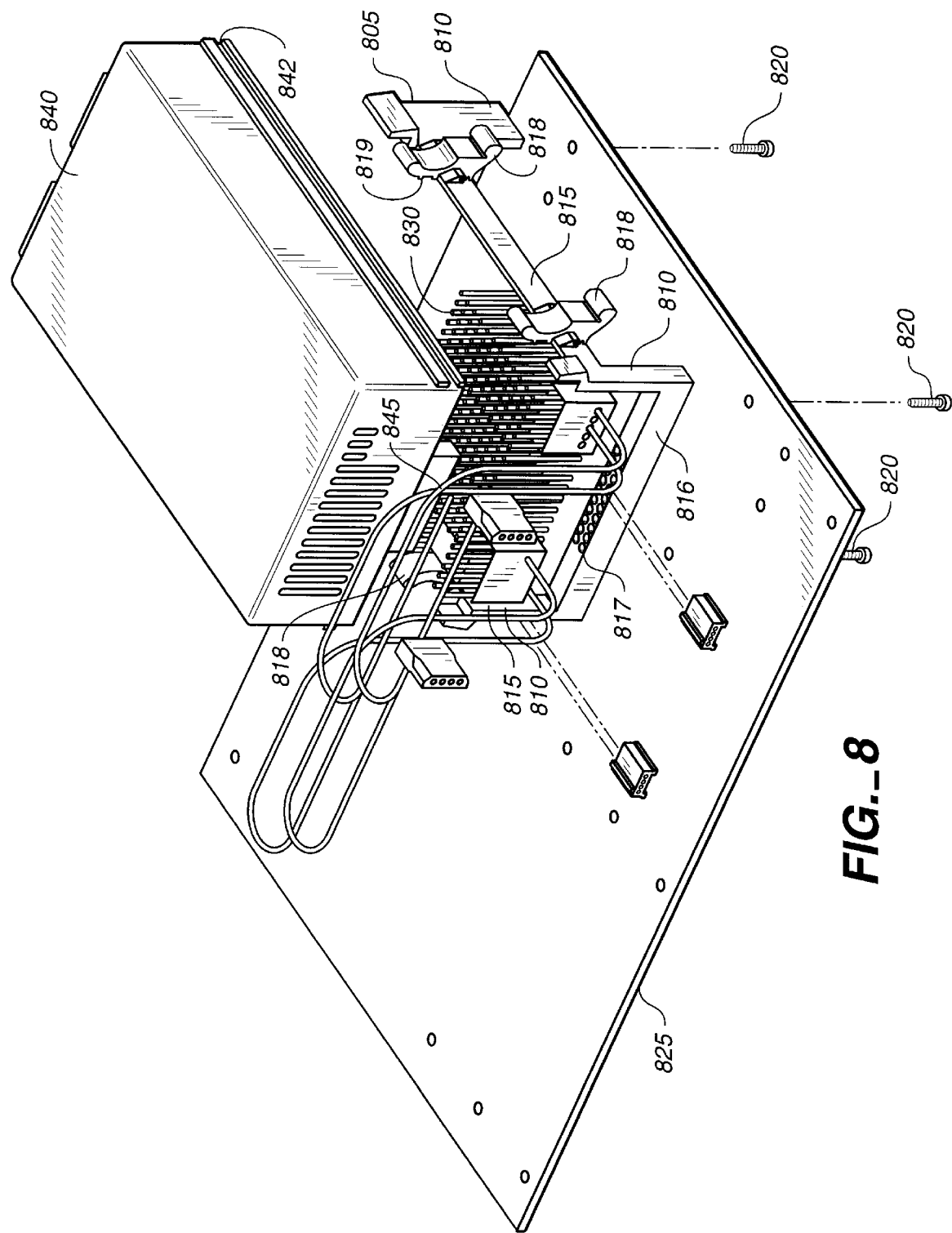
FIG._8

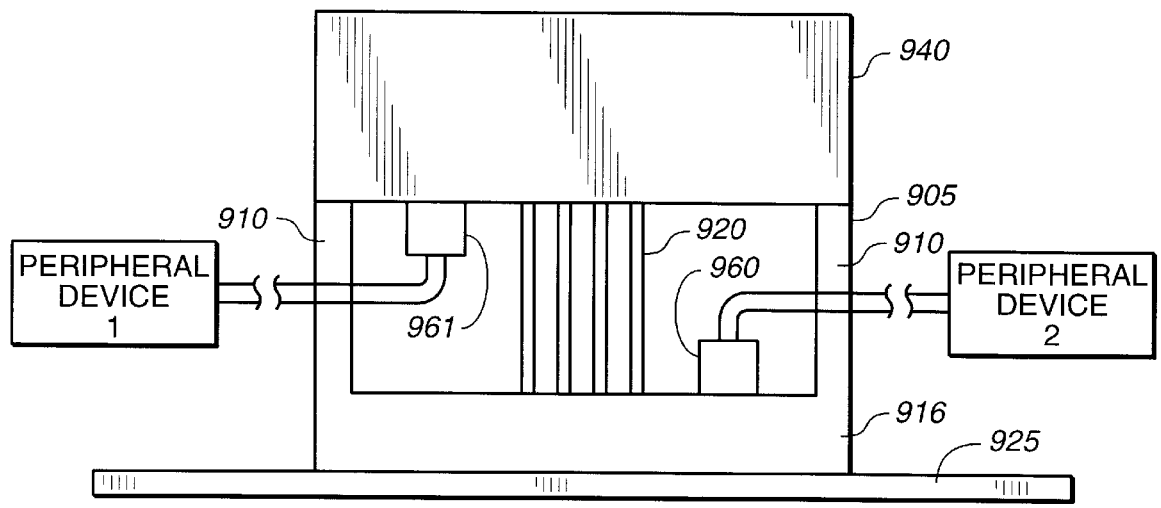
FIG._9
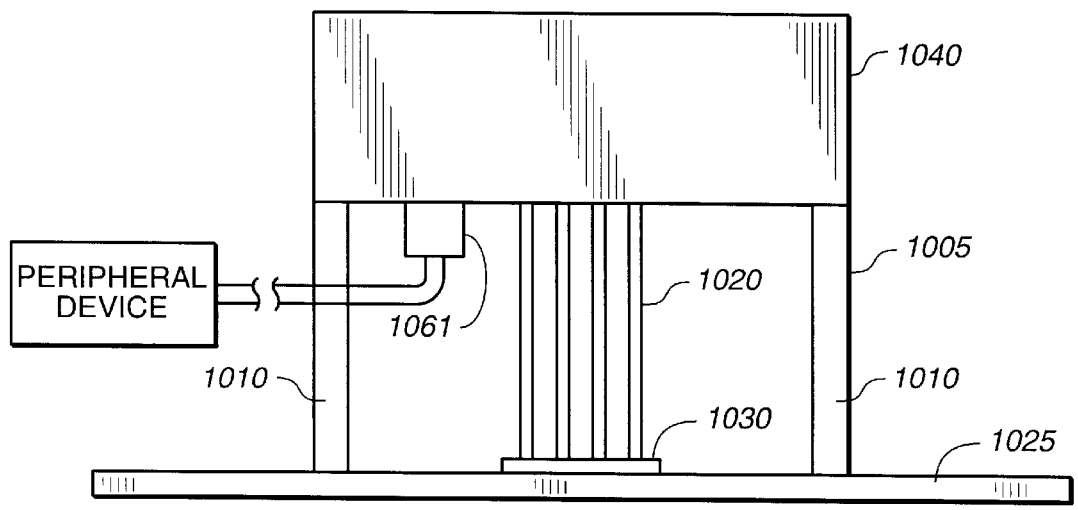
FIG._10

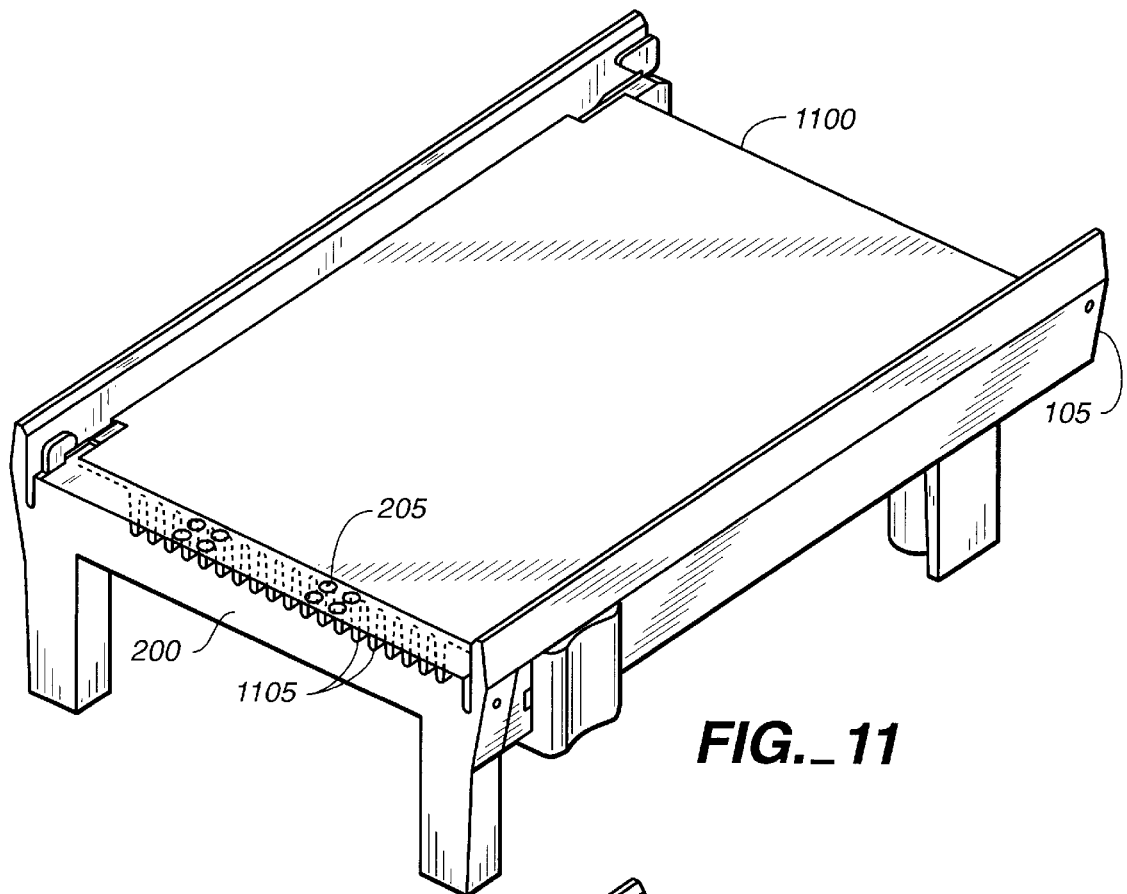
FIG._11
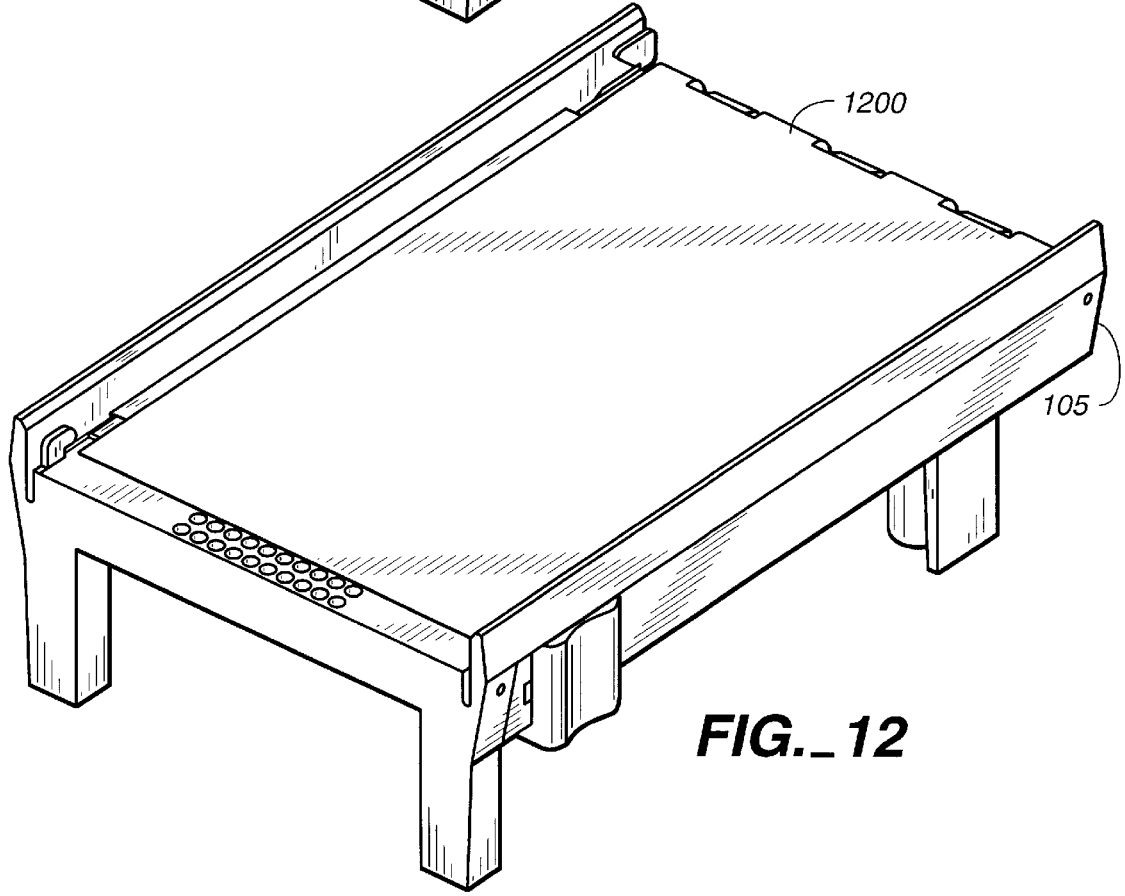
FIG._12

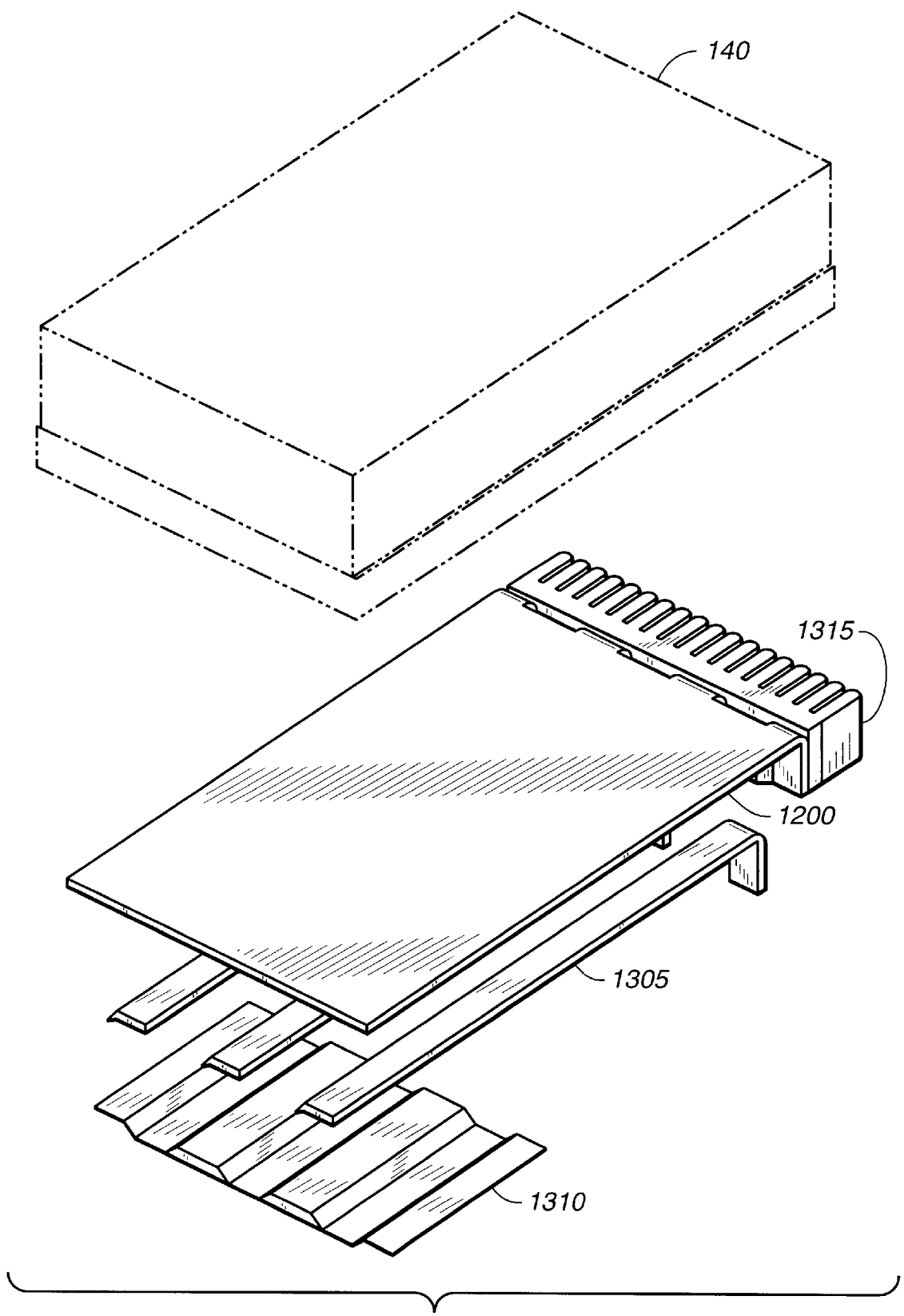
FIG._13

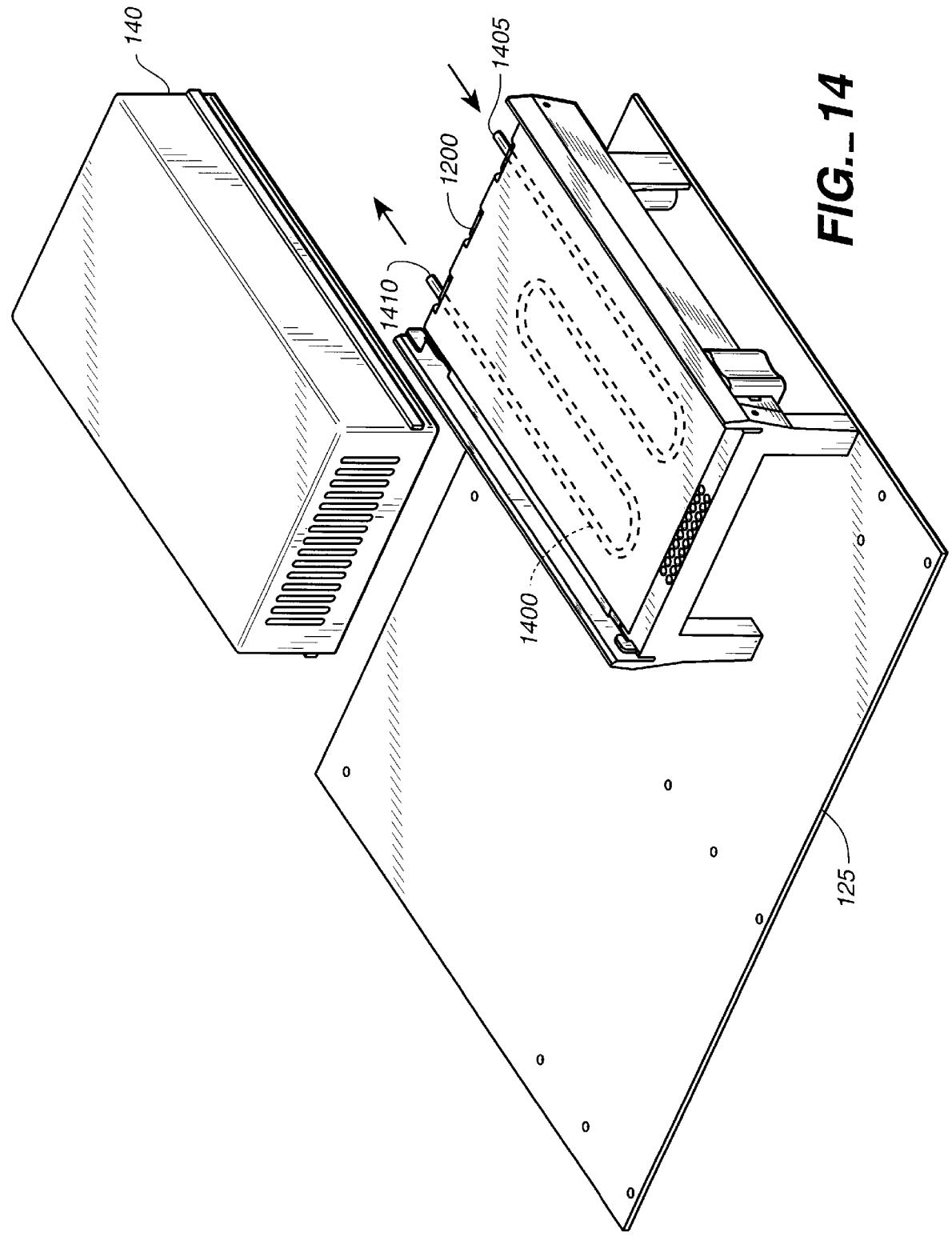
FIG._14

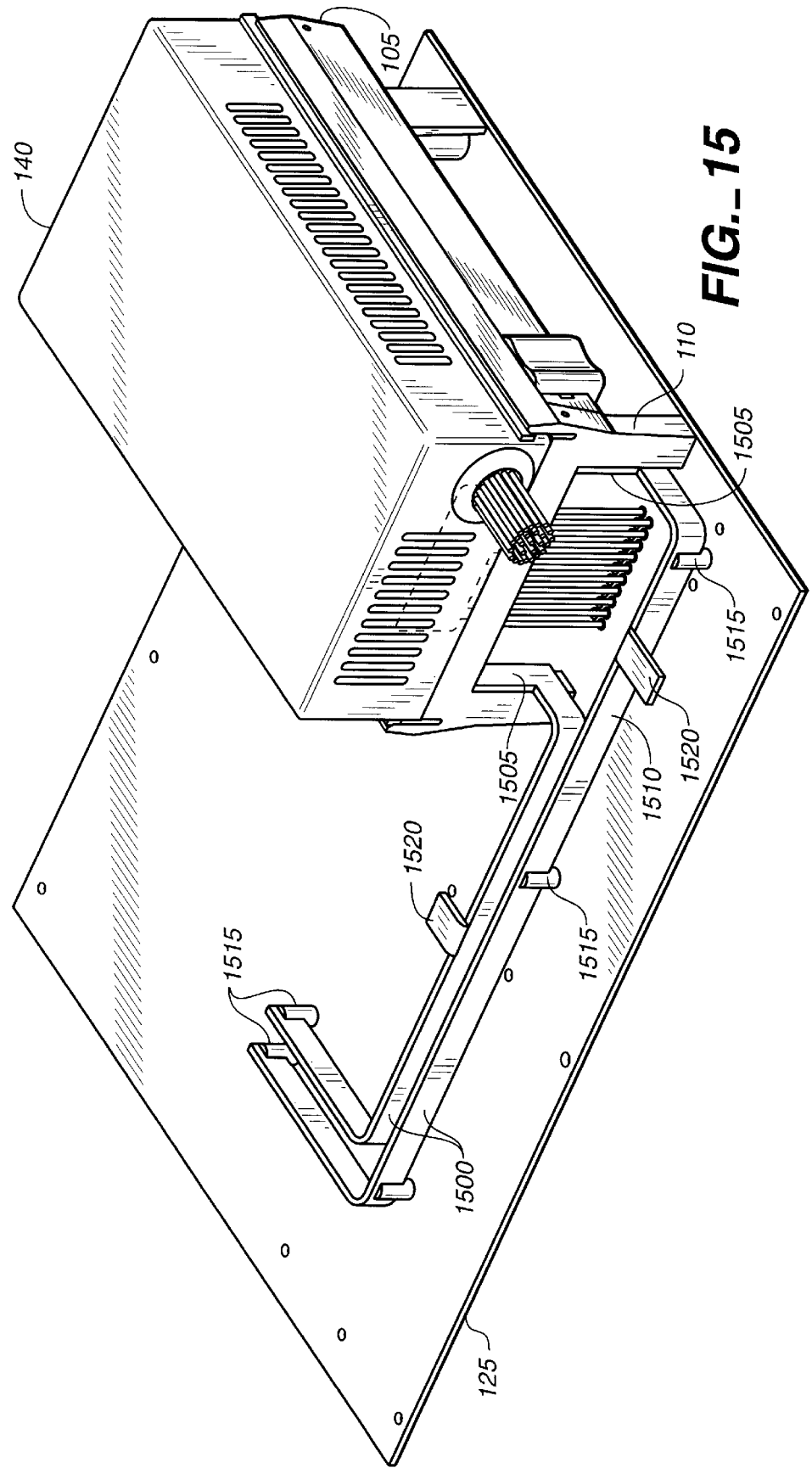
FIG._15

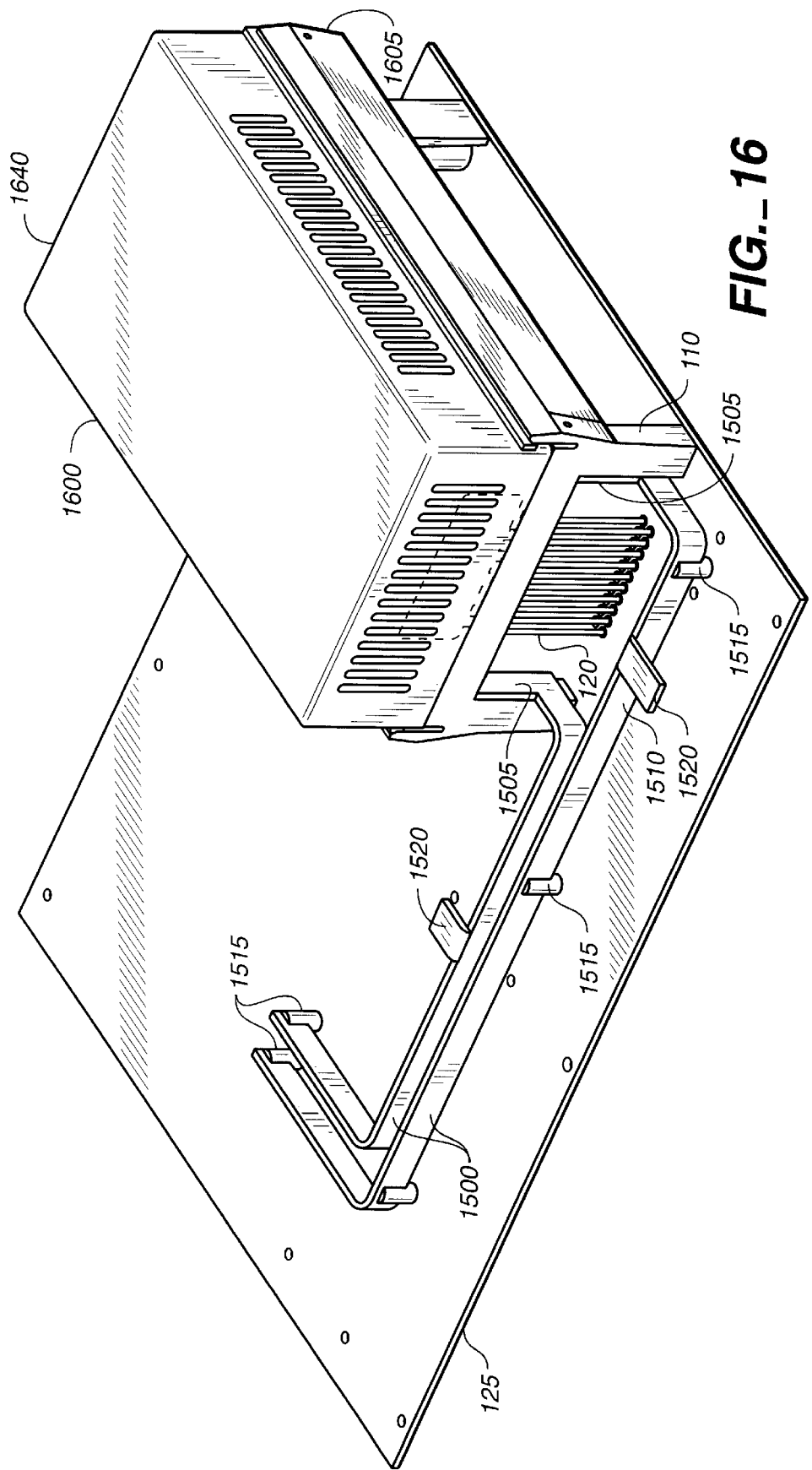
FIG._16

POWER SUPPLY SYSTEM FOR HIGH DENSITY PRINTED CIRCUIT BOARDS

BACKGROUND OF THE INVENTION

The present invention relates to power supply systems. More specifically, the present invention relates to a power supply mounting system for a high density printed circuit board.

All alternating current (AC) powered electronic equipment contain one or more power supplies to convert the AC input power to various lower direct current (DC) voltages needed by the circuits inside the equipment. In the prior art, a typical connection of power from the power supply to a printed circuit board on which various components such as integrated circuits (IC's) are mounted is by a wire harness. One or more printed circuit boards and peripheral devices have power coupled to them in this manner. In today's personal computers, a single large multilayer printed circuit board is usually included, a so called motherboard, and one or more IC's including the large microprocessor chip and various memory chips are mounted on this motherboard. Use of a wire harness to couple the power supply to a component on the motherboard has severe limitations as there are significant resistive losses and inductive effects in the wires of the wire harness and conductors in the multi-layer printed circuit board (PCB). As is known in the art, resistive losses are determined by the amount of current squared multiplied by the resistance of the wire or conductor. Similarly, inductive effects are largely determined by the rate at which current through a wire changes and the length of the wire. Accordingly, the resistive losses and inductive effects are significant in a wire or conductor that delivers power to an IC chip or other component that has a high power demand, especially where the active component operates at a low voltage and has a wide ranging and rapidly changing current demand which can significantly affect the voltage regulation limits at the IC chip.

Unfortunately, from the perspective of worsening regulation limits due to resistive losses and inductive effects, most modern day microprocessors have an increasing power demand, lower operating voltages, and a wide ranging and rapidly changing current demand. For example, the Intel Pentium Pro microprocessor operates at 3.1 volts and has a current demand that can change from 0 to 11.2 amps in 350 nanoseconds. It is expected that future microprocessors will operate at lower voltages and significantly higher current demand. This will significantly increase resistive losses and inductive effects in wires and conductors connecting the power supply to the microprocessor. As a result of the resistive losses and the inductance of such power coupling wires or conductors, a power supply with a wire harness is not able to deliver an accurately regulated low voltage to components on the motherboard drawing large transient currents.

In addition to having resistive losses and inductive effects, wire harnesses have reliability problems in manufacturing and handling.

The above disadvantages of using wire harnesses are well known in the art and have resulted in the use of distributed power systems in some applications. In a distributed power system, a simple AC to DC power supply produces a single voltage output which is distributed around the system. Typically, the power supply produces a bus voltage of 48 volts. This voltage is preferred because it is low enough to ensure compliance with international safety standards, yet high enough to reduce distribution losses which are proportional to the square of the current. However, other bus voltages, such as 24 or 12 volts, are also possible. The distributed power system also includes one or more high density DC to DC converters (i.e., converters that have a high power output per cubic volume of space that they occupy). These high density DC to DC converters are powered by the bus voltage and are placed in close proximity to the high power demand components powered by the power source. The reduced distance between the high power demand components and the adjacent power converter significantly reduces the resistive losses and the inductive effects in the wires and conductors coupling the power converter to the component.

However, fully distributed power systems are not yet cost effective in high volume, low cost systems, such as personal computer systems. Nonetheless, some components in personal computers require a very fast response from the AC-DC or DC-DC converter to which they are coupled. For example, many high performance processor chips used in personal computers require a fast transient current response from a DC to DC converter providing a tightly regulated programmable output from 1.8 to 3.6 volts to the processor chip. The need for precise voltage regulation by such chips requires use of what is known in the art as a voltage regulator module (VRM). A VRM can be either a complete plug-in DC to DC converter or a circuit implemented on the motherboard. The addition of a VRM to a power system increases the cost of the power system by as much as 50%. Additionally, VRMs occupy valuable motherboard area. This is particularly significant when the "wasted" area under the power converter or VRM is, for example, a portion of a 12–14 layer high density high cost motherboard.

Therefore, it is desirable to tightly regulate the voltage applied to one or more IC chips mounted on a PCB. It is also desirable to reduce resistive losses and inductive effects in delivering power to components on a printed circuit board. It is also desirable to efficiently utilize the surface area of a printed circuit board.

SUMMARY OF THE INVENTION

Broadly stated, the present invention encompasses a mounting structure for coupling power from a power supply to a predetermined area on a motherboard adjacent to an integrated circuit chip or chips. The mounting structure comprises a frame; a plurality of legs attached to the frame for supporting the frame on the motherboard, the ends of the legs opposite the frame being attached to the motherboard; means for releasably fastening the power supply to the frame such that the power supply is positioned a predefined distance above the upper surface of the motherboard; and a plurality of power buses interconnecting the power supply and the motherboard on an area on the motherboard adjacent one or more high power demand IC chips, wherein the high power demand IC chips are powered by the power supplied via the power buses such that resistive losses and inductive effects in delivering power to the IC chips are minimized.

In another embodiment of the present invention, the power buses are not a part of the mounting structure. Instead, the power buses extend downward from the bottom of the power supply and are coupled directly to the motherboard.

In yet another embodiment of the present invention, the mounting structure can be integral with or otherwise permanently attached to the power supply itself.

It is therefore an object of the present invention to provide a mounting structure for a power supply which enables the reduction of resistive losses and inductive effects in the delivering of power from the power supply to high power demand components, such as a microprocessor IC chip or chips on a motherboard of an electronic system such as a personal computer.

It is also an object of the present invention to tightly regulate the voltage applied to the high power demand components.

It is another object of the present invention to minimize the surface area on the motherboard occupied by the mounting structure and conductive traces used to couple power to the high power demand components on the motherboard.

These and other objects of the present invention will become apparent to those skilled in the art from the following detailed description of the invention, the accompanying drawings, and the appended claims.

BRIEF DESCRIPTION OF THE DRAWINGS

FIG. 1 is a front perspective view of a power supply placed on a first embodiment of the mounting structure of the present invention.

FIG. 2 is a rear perspective partially exploded, partially cut away view of the mounting structure shown in FIG. 1.

FIGS. 3–6 are partially cut away side views showing the power supply being installed on said first embodiment of the mounting structure of the present invention.

FIG. 7 is a cross sectional view of the power supply mounted on the mounting structure taken along line 7'—7' of FIG. 6.

FIG. 8 is an exploded view of a power supply installed on a second embodiment of the mounting structure of the present invention.

FIG. 9 is a schematic diagram of one embodiment of the coupling of power between the power supply and the motherboard.

FIG. 10 is a schematic diagram of another embodiment of the coupling of power between the power supply and the motherboard.

FIG. 11 is a front perspective view of the first embodiment of the mounting structure of the present invention incorporating a first embodiment of a heatsink.

FIG. 12 is a front perspective view of the first embodiment of the mounting structure of the present invention incorporating a second embodiment of a heatsink.

FIG. 13 is an exploded view of the heatsink in FIG. 12 utilizing heat pipes to transfer heat to a second heatsink.

FIG. 14 is a front partially exploded perspective view of the mounting structure and heatsink combination shown in FIG. 12 incorporating cooling liquid pipes.

FIG. 15 is a front perspective view of an embodiment of the present invention incorporating extended bus bars.

FIG. 16 is a front perspective view of an embodiment of the present invention wherein the power supply is permanently attached to the mounting structure.

DETAILED DESCRIPTION OF THE INVENTION

FIG. 1 shows a front perspective view of a power supply installed on a first embodiment of a mounting structure of the present invention. As shown in FIG. 1, a mounting structure 105 according to the present invention comprises four legs 110, a frame 115 coupled to the legs 110 and power buses 120 extending from frame 115 to a printed circuit motherboard 125. In a preferred embodiment, each of legs 110 has a longitudinal axis that is substantially perpendicular to the upper surface of motherboard 125. In a preferred embodiment of the present invention, power buses 120 are also substantially perpendicular to the upper surface of motherboard 125 and are inserted into couplers 130 in motherboard 125 and soldered to couplers 130. It is to be noted that some of the power buses 120 may be used to send control signals from the motherboard to the power supply. In another embodiment, the power buses can be directly soldered into the motherboard, in which case there would be no need for couplers 130. A power supply 140 is shown installed on mounting structure 105. Power supply 140 may be an AC to DC converter or a DC to DC converter. Power supply 140 receives input power from a source coupled to power supply 140 via socket 142, which for an AC input is preferably an IEC 320 socket with a separate standard AC cable, and outputs power to electrical components, such as IC chip 136, mounted on motherboard 125. Power supply 140 also outputs power via a coupling cable 141, which is preferably a group of output cables for coupling power to various peripherals (not shown). These electrical components may include one or more microprocessors or other electronic circuit components coupled to the motherboard. In one embodiment of the present invention, one or more IC chips, such as IC chip 136, may be disposed on the motherboard under the power supply 140 in an area adjacent to power buses 120 and couplers 130. IC chip 136 may be a microprocessor such as an Intel Pentium Pro or any other high power demand microprocessor. Power buses 120 conduct power from power supply 140 to IC chip 136 on motherboard 125. Power buses 120 may also provide mechanical support for mounting structure 105. It is to be noted that IC chip 136 is placed adjacent power buses 120 and couplers 130 so as to minimize the length of the power conductors and the adjacent power buses 120 between power supply 140 and IC chip 136. Reducing the length of these power lines reduces the resistive losses and the inductive effects in the power lines and, therefore, improves the voltage regulation and the efficiency with which power is delivered to the IC chip or chips on the motherboard. Delivering power to IC chip 136 efficiently and within a narrow voltage band specification under all chip operating conditions is particularly important when the IC chip has a rapidly changing high power demand, i.e., it draws a significant amount of current at a low voltage and/or the amount of current it draws varies rapidly within a very short period of time.

In addition to reducing resistive losses and inductive effects, the mounting structure 105 of the present invention allows more efficient use of the surface area of the motherboard 125 because it permits placement of high power demand components, such as IC chip 136, in an area of the motherboard either beneath or adjacent to power supply 140. The efficient use of the surface area of the motherboard to carry high cost, high density semiconductor ICs is particularly significant when, as in a preferred embodiment of the present invention, motherboard 125 is a multilayer high density motherboard. It is to be noted that motherboard 125 need not be a multilayer high density motherboard and may be any type of printed circuit board. Similarly, it is to be noted that the high power demand components are not restricted to being ICs and may be any other type of high power demand component.

Although, in a preferred embodiment, one or more IC chips are positioned under the power supply 140, placing an IC chip under the power supply is not necessary for deriving the benefits of reduced resistive losses and inductive effects (and the consequent tightly regulated voltage application to the IC chip(s)) provided by the mounting structure of the present invention. The important factor for deriving the benefits of reduced resistive losses and inductive effects is the proximity between the IC chip and the area where the power buses 120 are electrically connected to the motherboard. Thus, for example, placing an IC chip on or near an area adjacent to power buses 120 and couplers 130, such as the area outlined by dashed rectangle 135, which is not under power supply 140, will still provide the benefits of lower resistive losses and inductive effects provided by the mounting structure of the present invention.

Additionally, while legs 110 are for supporting the mounting structure on the motherboard, they may also serve other purposes. For example, the front legs 110, i.e., the legs closer to power buses 120, may comprise conductors that are used to deliver power from the power supply to the motherboard and the electronic components disposed thereon. Thus, in one embodiment of the present invention, the front legs 110 may comprise power buses 120, so as to electrically couple the power supply to the motherboard and the electronic components disposed thereon. In a preferred embodiment of the present invention wherein such conductive legs 110 are used, they would preferably be encased in an insulating material.

FIG. 2 shows a rear perspective view of the mounting structure 105 shown in FIG. 1 with the power supply 140 removed. FIG. 2 also shows IC chip 136 disposed on the motherboard adjacent power buses 120 and couplers 130. Mounting structure 105 comprises a frame 115 and a plurality of legs 110 attached to frame 105 for supporting frame 115 on motherboard 125. As shown in FIG. 2, the ends of legs 110 opposite frame 105 are attached to motherboard 125. Mounting structure 105 further comprises means for releasably fastening a power supply to frame 115 such that the power supply is positioned a predefined distance above the upper surface of the motherboard. Frame 115 of mounting structure 105 includes horizontal segment 200, whose longitudinal axis is parallel to the upper surface of motherboard 125. Horizontal segment 200 includes a plurality of sockets 205 which are disposed on its upper surface. Power pins from the power supply are inserted into sockets 205 when the power supply is mounted on the mounting structure 105 to allow power from the power supply to be coupled to the motherboard via power buses 120. The fastener means includes a pair of pivoting hooks 215 located near the rear end of frame 115. Fastener means also preferably includes a pair of spring loaded locking mechanisms 220 near the front end of frame 115. Each spring loaded locking mechanism 220 comprises a sliding hook 221, a spring compression tab 222, a spring 223 and a release tab 224 for unlocking spring loaded locking mechanism 220.

FIGS. 3–6 are partially cut away side views which together illustrate installation of a power supply on mounting structure 105 according to the present invention. In FIG. 3–6, the encircled numbers 1–5 indicate sequential steps in the installation of power supply 140 on the mounting structure 105. In step one, shown in FIG. 3, power supply 140 is pushed back in the direction shown by the arrow 351 as pivoting hooks 215 are inserted into corresponding apertures at the back end of power supply 140. As pivoting hooks 215 are inserted into corresponding apertures in power supply 140, overextending portions 315 of hooks 215 slide over plate 340. Once pivoting hooks 215 are sufficiently inserted into the corresponding apertures and overextending portions 315 sufficiently cover plate 340, power supply 140 is preferably pivoted upward in the direction shown by arrow 352. As shown in FIG. 4, as pivoting hooks 215 are further inserted into said corresponding apertures, pivoting hooks 215 are further pivoted upward and overextending portions 315 further cover plate 340. Then power supply 140 is pivoted downward in the direction shown by arrow 453. Subsequently, as shown in FIG. 5, the front portion of power supply 140 is lowered onto sliding hook 221 of the locking mechanism 220. As shown in FIG. 5, plate 340 rests on hook 221. The weight of the power supply 140 and any additional downward force applied thereto causes sliding hook 221 to be pushed back in the direction of arrow 554 by plate 340. As sliding hook 221 is moved in the direction of arrow 554, power supply 140 is lowered further downward until the lower surface of power supply 140 is in full contact with the horizontal surface 211 (shown in FIG. 2) of the frame member 210. As power supply 140 is fully lowered, as shown in FIG. 6, spring 223 causes the sliding hook 221 to slide back in the direction opposite to that shown by arrow 454. On each side of power supply 140, the overextending portions 315 and 321 of hooks 215 and 221, respectively, rest on the back and front ends, respectively, of plate 340 in power supply 140. This locks power supply 140 onto the frame 115 and consequently mounting structure 105. In a preferred embodiment of the present invention, a pair of rails positioned along the sides of an extruded power supply casing are used instead of plate 340 to achieve the above locking effect.

Spring loaded locking mechanism 220 thus secures power supply 140 to frame 115 and mounting structure 105 and ensures sufficient pressure for electrical contact between power pins coupled to power supply 140 and sockets 205 on horizontal segment 200. To remove power supply 140, release tabs 224 are moved towards the front end 650 of mounting structure 105, which causes overextending portion 621 to be moved away from plate 340, thus releasing the front end of power supply 140 and enabling its removal from mounting structure 105 in a manner that is the reverse of what is shown in FIGS. 3–6.

Mounting structure 105 allows easy installation and removal of a power supply. Additionally, mounting structure 105 is not specific to any particular power supply. Therefore, mounting structure 105 may be used with any power supply having a frame adapted to snap onto mounting structure 105. This allows mounting structure 105 to be used with a variety of power supplies. It further facilitates the installation of a power supply upgrade or replacement. This is useful since a new, more high powered microprocessor IC chip may be installed on the motherboard, and may have different power requirements than the IC chip being replaced. In other words, since the replacement of the power supply is facilitated, the replacement of an IC chip with a new IC chip of higher power, or other difference power needs, is easily accommodated.

FIG. 7 shows a cross sectional view of power supply 140 mounted on mounting structure 105 along line 7'—7' in FIG. 6. As shown in FIG. 7, overextending portions 315 of hooks 215 help secure plate 340 to frame 115.

FIG. 8 shows an exploded perspective view of a second embodiment of a mounting structure of the present invention. As shown in FIG. 8, mounting structure 805 is fastened to motherboard 825 by screws 820. Power supply 840 is affixed to mounting structure 805 by clips 818. Mounting structure 805 includes a plurality of legs 810 for supporting the mounting structure 805. A pair of frame members 815 are coupled to the legs 810. Frame members 815 each have a longitudinal axis that is parallel to the upper surface of motherboard 825. Furthermore, to increase rigidity, mounting structure 805 may include a support bar 816 connected between legs 810 at the front end of mounting structure 805, as shown. The lower surface of support bar 816 is preferably in direct contact with the upper surface of motherboard 825 while its upper surface has a plurality of sockets 817 disposed thereon. A plurality of power buses 845 are disposed on the bottom of power supply 840 and are inserted into sockets 817 so as to electrically couple power supply 840 to motherboard 825 and electrical components disposed thereon. It is to be noted that, whereas in mounting structure 105, the power buses are part of the mounting structure, mounting structure 805 does not include power buses. Frame members 815 each include two clips 818 disposed thereon. A ridge 819 in each clip 818 is inserted into a groove 842 on the side of power supply 840 so as to releasably fasten power supply 840 to mounting structure 805. As also shown in FIG. 7, a heatsink 830 is disposed above an IC chip (not shown) coupled to the motherboard. Heatsink 830 dissipates heat generated by the IC chip. It may also help dissipate heat generated by power supply 840. The IC chip disposed below heatsink 830 is powered by power supply 840 via power buses 845. The IC chip is disposed adjacent the power buses. More specifically, the area on the motherboard where the power buses 845 or sockets 817 are electrically coupled to the motherboard is as close to the IC chip as possible such that resistive losses and inductive effects in delivering power to the IC chip are minimized.

FIG. 9 shows a schematic diagram of one embodiment of the coupling between a power supply and a motherboard. As shown in FIG. 9, power supply 940 is disposed above mounting structure 905, which is in turn disposed on motherboard 925. Mounting structure 905 comprises legs 910 and support bar 916 coupled to legs 910. Power buses 920 coupled to the bottom of power supply 940 are inserted into corresponding sockets on support bar 916. Power from the power supply 940 is coupled to motherboard 925 via power buses 920 and conductors (not shown) in support bar 916. Also shown in FIG. 9 are connectors 960 and 961 coupled to support bar 916 and power supply 940, respectively. It is to be noted that, in a preferred embodiment of the present invention, only one of connectors 960 and 961 is coupled to mounting structure 905. It is also to be noted that both connectors 960 and 961 are shown in FIG. 9 to demonstrate the alternative sites for coupling connectors and that in some embodiments, as shown in FIG. 9, it is possible to have both connectors coupled to mounting structure 905. In a preferred embodiment, connectors 960 and 961 are conventional female sockets. Connector 960 is electrical coupled to the power supply 940 via power buses 920 and conductors (not shown) in support bar 916 while connector 961 is directly electrically coupled to power supply 940. It is to be noted that connectors 960 and 961 need not be female sockets but may be any type of connector. Connectors 960 and 961 enables power to be coupled to one or more peripheral device(s) from power supply 940.

FIG. 10, shows a schematic diagram of another embodiment of the coupling between power supply 1040 and motherboard 1025. In the embodiment shown in FIG. 10, there is no support bar 1016. Instead, power buses 1020 are coupled to motherboard 1025 by couplers 1030 on motherboard 1025. As in FIG. 9, a connector 1061 enables power supply 1040 to provide power to one or more peripheral devices (not shown) in addition to providing power to motherboard 1025.

FIG. 11 is a front perspective view of the mounting structure shown in FIG. 1 incorporating an integral heatsink.

As shown in FIG. 11, mounting structure 105 includes a heatsink 1100. Vanes 1105 are shown by dashed lines to emphasize that they are behind horizontal segment 200 in the view shown in FIG. 11. Also shown in FIG. 11 are sockets 205. Unlike in FIG. 2, not all the sockets on horizontal segments 200 are shown so as not to unduly obscure the view of vanes 1105 in the mounting structure of FIG. 11. Heatsink 1100 is integral with mounting structure 105 and includes vanes 1105 to increase heat dissipation from heatsink 1100. It is to be noted that heatsink 1100 need not be integral with mounting structure 105, but may in some embodiments be coupled to mounting structure 105. Heat sink 1100 dissipates heat generated by the power supply disposed above heatsink 1100. In a preferred embodiment, heatsink 1100 is made of aluminum. It is to be noted that heatsink 1100 may be made of any other material suitable for heat dissipation.

FIG. 12 is a front perspective view of the mounting structure shown in FIG. 1 incorporating a second heatsink. Heatsink 1200 is integral with mounting structure 105. In another embodiment of the present invention, heatsink 1200 may be snapped onto mounting structure 105 in a conventional manner rather than being integral therewith.

FIG. 13 shows an exploded view of heatsink 1200 shown in FIG. 12 attached to a second heatsink. As shown in FIG. 13, heatsink 1200 includes a plurality of heat pipes 1305 coupled to a heat plate 1310. Additionally heat pipes 1305 are coupled to a second heatsink 1315. Heatsink 1315 is coupled to the back of the PC chassis (not shown). In a preferred embodiment, heat plate 1310 and heatsink 1315 are all made of aluminum, but may be made of any other material suitable for heat dissipation. Heat pipes 1305 may comprise Noren Mini Flats (available from Noren Products, Inc.) or equivalent heat transfer devices. Power supply 140 is shown in phantom.

FIG. 14 is a partially exploded view of the mounting structure and heatsink of the type shown in FIG. 12 further incorporating cooling liquid pipes 1400. Also shown in FIG. 14 are power supply 140 and motherboard 125. Cooling liquid is injected into cooling liquid pipes 1400 at entrance 1405. As the cooling liquid passes through cooling liquid pipes 1400, heat from heatsink 1200 is transferred to the cooling liquid. Thus, when the cooling liquid exits the cooling pipes 1400 at exit 1410, the temperature of the cooling liquid is higher than it was when the cooling liquid entered cooling pipes 1400. The cooling liquid, therefore, removes heat from heatsink 1200. In a preferred embodiment of the present invention, the cooling liquid is water. It is to be noted that other cooling liquids may be used to remove heat from heatsink 1200.

In one embodiment of the present invention, the power supply can incorporate a fan which cools components mounted on the motherboard and under the frame.

FIG. 15 shows power supply 140 mounted on mounting structure 105. Also shown in FIG. 15 are bus bars 1500 which deliver power to devices located on motherboard 125. Vertical portions 1505 of bus bars 1500 extend downward along legs 110 of mounting structure 105 and couple power from power supply 140 to the horizontal portions 1510 of bus bars 1500. Horizontal portions 1510 are supported on motherboard 125 by stands 1515. In a preferred embodiment of the present invention, horizontal portions 1510 run above motherboard 1525 such that there is sufficient clearance between horizontal portions 1510 and motherboard 1525 to allow electronic devices to be located on the surface of motherboard 1525 in areas underneath horizontal portions 1510. Also shown in FIG. 15 are power tabs 1520 for delivering power from the bus bars 1500 to a device to be powered by bus bars 1500. Stands 1515 are conductive and allow power to be delivered from bus bars 1500 to motherboard 125 with negligible resistive losses.

FIG. 16 shows a front perspective view of an embodiment of the present invention wherein a mounting structure 1605 is integral with or otherwise permanently affixed to a power supply 1640. As can be seen in FIG. 16, mounting structure 1605 is preferably an extension of the casing of power supply 1640 to create a mounting-structure power supply structure 1600. As also shown in FIG. 16, power buses 120 are directly coupled from power supply 1640 to motherboard 125. As mounting structure 1605 is integral with power supply 1640, it does not include release tabs 224 (shown in FIGS. 1–6, 11–12, and 14–15 and referenced in FIG. 2) to unlock the power supply from the mounting structure. The elements of the integral mounting structure-power supply structure (power supply system) 1600 of FIG. 16 are referenced with the same numbers and serve the same purpose as their corresponding components in FIG. 15. As those components have been described in relation to FIG. 15, they will not be further described herein.

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

We claim:

1. In an electrical system having a motherboard on which at least one integrated circuit (IC) chip is mounted, a mounting structure for coupling power from a power supply to a predetermined area on the motherboard adjacent the IC chip, said mounting structure comprising:
   a frame;
   a plurality of legs attached to the frame for supporting said frame on the motherboard, the ends of said legs opposite said frame being attached to the motherboard;
   means for releasably fastening said power supply to said frame such that the power supply is positioned a predefined distance above the upper surface of the motherboard; and
   a plurality of power buses interconnecting said power supply and the motherboard, wherein the IC chip is powered by said power supply via said power buses such that resistive losses and self-inductive effects in delivering power from said power supply to the IC chip are minimized.

2. The mounting structure of claim 1, wherein said frame includes a horizontal segment having a plurality of sockets into which pins coupled to said power supply are inserted.

3. The mounting structure of claim 1, wherein said power buses act as one or more of said legs of said mounting structure in addition to conducting power from the power supply to the motherboard.

4. The mounting structure of claim 2, wherein said fastening means comprises a locking mechanism to secure the power supply to said frame and to ensure sufficient pressure for electrical contact between said pins coupled to the power supply and said sockets on said horizontal segment.

5. The mounting structure of claim 4, wherein said fastening means comprises clips, wherein said clips releasably fasten said power supply to said frame.

6. The mounting structure of claim 1, further comprising a heatsink coupled to said frame.

7. The mounting structure of claim 6, wherein said heatsink comprises a plurality of heat pipes for dissipating heat generated by said power supply.

8. The mounting structure of claim 6, wherein said heatsink comprises a cooling liquid pipe for dissipating heat generated by said power supply.

9. The mounting structure of claim 1, further comprising a connector to enable power to be delivered to one or more peripheral devices in said electrical system.

10. In an electrical system having a motherboard on which at least one integrated circuit (IC) chip is mounted, a mounting structure for coupling power from a power supply to a predetermined area on the motherboard adjacent the IC chip, said mounting structure comprising:
    a frame;
    a plurality of legs attached to said frame, said plurality of legs supporting said frame on the motherboard, the ends of said legs opposite said frame being attached to the motherboard;
    a fastener coupled to said frame for releasably fastening said power supply to said frame such that the power supply is positioned a predefined distance above the upper surface of the motherboard; and
    a plurality of power buses interconnecting said power supply and the motherboard, wherein the IC chip is powered by said power supply via said power buses such that resistive losses and inductive effects in delivering power to the IC chip are minimized.

11. The mounting structure of claim 10, wherein said plurality of legs comprise four legs, each leg having a longitudinal axis that is substantially perpendicular to the upper surface of the motherboard.

12. The mounting structure of claim 11, wherein said frame comprises a plurality of frame members, each said frame member having a longitudinal axis that is substantially parallel to the upper surface of the motherboard, further wherein one of said plurality of frame members has a plurality of sockets into which pins coupled to the power supply are inserted.

13. The mounting structure of claim 10, wherein said power buses act as one or more of said legs of said mounting structure in addition to conducting power from the power supply to the IC chip on the motherboard.

14. The mounting structure of claim 12, wherein said fastener comprises a locking mechanism to secure the power supply to said frame and to ensure sufficient pressure for electrical contact between pins on the power supply and said sockets on said frame member.

15. The mounting structure of claim 14, wherein said fastener comprises clips to releasably fasten the power supply to said frame.

16. The mounting structure of claim 10, further comprising a heatsink coupled to said frame.

17. The mounting structure of claim 16, wherein said heatsink comprises a plurality of heat pipes for dissipating heat generated by said power supply.

18. The mounting structure of claim 16, wherein said heatsink comprises a liquid cooling pipe for dissipating heat generated by said power supply.

19. The mounting structure of claim 10, further comprising a connector to enable power to be delivered to one or more peripheral devices in said electrical system.

20. In an electrical system having a motherboard on which at least one integrated circuit (IC) chip is mounted, a mounting structure for coupling power from a power supply to a predetermined area on the motherboard adjacent the IC chip, said mounting structure comprising:

a frame;

a plurality of legs attached to said frame for supporting said frame on the motherboard, the ends of said legs opposite said frame being attached to the motherboard;

means for releasably fastening said power supply to said frame such that the power supply is positioned a predefined distance above the upper surface of the motherboard, wherein said fastening means is coupled to said frame; and means for coupling power from said power supply to the motherboard on said predetermined area adjacent the IC chip, wherein the IC chip is powered by said power supply such that resistive losses and inductive effects in delivering power to the IC chip are minimized.

21. The mounting structure of claim 20, wherein said coupling means comprises power buses coupled to said power supply and further wherein said frame comprises a horizontal segment coupled to the motherboard and having a plurality of sockets for coupling said power buses to the motherboard.

22. The mounting structure of claim 21, wherein said fastening means comprises a locking mechanism to secure said power supply to said frame and to ensure sufficient pressure for electrical contact between said power buses and said sockets on said horizontal segment.

23. The mounting structure of claim 20, further comprising a heatsink coupled to said frame.

24. The mounting structure of claim 23, wherein said heatsink comprises a plurality of heat pipes for dissipating heat generated by said power supply.

25. The mounting structure of claim 23, wherein said heatsink comprises a cooling liquid pipe for heat dissipating heat generated by said power supply.

26. The mounting structure of claim 20, further comprising a connector to enable power to be delivered to one or more peripheral devices in said electrical system.

27. A power supply system for mounting on a motherboard on which at least one integrated circuit (IC) chip is mounted, said power supply system coupling power to a predetermined area on the motherboard adjacent to the IC chip, said power supply system comprising:

a power supply; and a mounting structure affixed to said power supply, said mounting structure comprising:

a frame;

a plurality of legs attached to said frame for supporting said frame on the motherboard such that said power supply is positioned a predefined distance above the upper surface of the motherboard, the ends of said legs opposite said frame being attached to the motherboard; and a plurality of power buses interconnecting said power supply and the motherboard, wherein the IC chip is powered by said power supply via said power buses such that resistive losses and self-inductive effects in delivering power from said power supply to the IC chip are minimized.

28. The power supply system of claim 27, wherein said frame includes a horizontal segment having a plurality of sockets into which pins coupled to said power supply are inserted.

29. The power supply system of claim 27, wherein said power buses act as one or more of said legs of said mounting structure in addition to conducting power from said power supply to the motherboard.

30. The power supply system of claim 27, further comprising a heatsink coupled to said frame.

31. The power supply system of claim 30, wherein said heatsink comprises a plurality of heat pipes for dissipating heat generated by said power supply.

32. The power supply system of claim 30, wherein said heatsink comprises a cooling liquid pipe for dissipating heat generated by said power supply.

33. The power supply system of claim 27, further comprising a connector to enable power to be delivered to one or more peripheral devices.

34. The power supply system of claim 27, wherein said plurality of legs comprise four legs, each leg having a longitudinal axis that is substantially perpendicular to the upper surface of the motherboard.

35. The power supply system of claim 27, wherein said frame comprises a plurality of frame members, each said frame member having a longitudinal axis that is substantially parallel to the upper surface of the motherboard, further wherein one of said plurality of frame members has a plurality of sockets into which pins coupled to said power supply are inserted.

36. The power supply system of claim 27, where said mounting structure is integral with said power supply.

* * * * *